United States Patent
Jones et al.

(10) Patent No.: US 11,514,183 B2
(45) Date of Patent: Nov. 29, 2022

(54) DATA STORAGE SYSTEM WITH DECENTRALIZED POLICY ALTERATION

(71) Applicant: Seagate Technology LLC, Fremont, CA (US)

(72) Inventors: Michael V. Jones, Scotts Valley, CA (US); Corey Hill, Broomfield, CO (US); Carol Joy Gray, El Cerrito, CA (US)

(73) Assignee: SEAGATE TECHNOLOGY LLC

( * ) Notice: Subject to any disclaimer, the term of this patent is extended or adjusted under 35 U.S.C. 154(b) by 197 days.

(21) Appl. No.: 17/248,572

(22) Filed: Jan. 29, 2021

(65) Prior Publication Data

US 2022/0245269 A1 Aug. 4, 2022

(51) Int. Cl.
*G06F 17/00* (2019.01)
*G06F 21/62* (2013.01)
*H04L 29/06* (2006.01)

(52) U.S. Cl.
CPC .................. *G06F 21/6218* (2013.01)

(58) Field of Classification Search
CPC .................................................. G06F 21/6218
See application file for complete search history.

(56) References Cited

U.S. PATENT DOCUMENTS

| | | | |
|---|---|---|---|
| 8,180,882 B2 * | 5/2012 | Liss | H04L 43/0817 370/254 |
| 9,201,815 B2 * | 12/2015 | Frei | H04L 61/256 |
| 9,262,915 B2 * | 2/2016 | Clem | G08G 1/08 |
| 9,628,354 B2 * | 4/2017 | Ogielski | H04L 45/12 |
| 9,646,276 B2 * | 5/2017 | Rea | G06Q 10/0639 |
| 10,229,162 B2 * | 3/2019 | Heinz | G06F 16/24549 |
| 10,333,808 B2 * | 6/2019 | Coleman, Jr | G06F 21/33 |
| 10,365,905 B1 * | 7/2019 | Ong | G06F 8/433 |
| 10,593,380 B1 * | 3/2020 | Volpe | G06F 17/18 |
| 10,867,063 B1 * | 12/2020 | Avanes | G06F 16/221 |
| 11,016,679 B2 * | 5/2021 | Secatch | G06F 3/061 |
| 11,144,403 B2 * | 10/2021 | Doddaiah | G06F 3/067 |
| 11,294,788 B2 * | 4/2022 | Perez | G06F 11/3485 |
| 11,438,237 B1 * | 9/2022 | Subramanian | H04L 12/4641 |
| 2019/0084691 A1 * | 3/2019 | Pathak | G08G 5/0047 |
| 2019/0279108 A1 * | 9/2019 | Yale | G06N 7/005 |
| 2019/0294780 A1 * | 9/2019 | Melamed | G06F 21/53 |
| 2019/0332978 A1 * | 10/2019 | Farooq | G06Q 10/06 |
| 2020/0042338 A1 * | 2/2020 | Poothia | G06F 12/023 |
| 2020/0089558 A1 * | 3/2020 | Stankevichus | G06F 11/073 |

(Continued)

*Primary Examiner* — Gary S Gracia
(74) *Attorney, Agent, or Firm* — Hall Estill Law Firm

(57) ABSTRACT

A data storage system may track data access operations to a memory with a distribution module and translate the tracked data access operations into at least one activity with the distribution module. The distribution module generates a decentralization strategy and then creates a first visual representation of the at least one activity and a second visual representation of the at least one activity with the distribution module. The respective visual representations are distributed to a first user and a second user with the first user and second user respectively selected by the decentralization strategy for analysis for a purpose assigned by the decentralization strategy. The distribution module grants the first user a first temporary permission to alter at least one operational policy of the memory in response to a result of the first purpose.

20 Claims, 5 Drawing Sheets

(56) References Cited

U.S. PATENT DOCUMENTS

| | | | |
|---|---|---|---|
| 2020/0310690 A1* | 10/2020 | Annavaram | G06F 3/061 |
| 2021/0073034 A1* | 3/2021 | Bliesner | G06Q 30/0641 |
| 2021/0240690 A1* | 8/2021 | Cseri | G06F 16/221 |
| 2021/0342084 A1* | 11/2021 | Ng | G06F 3/061 |
| 2022/0107748 A1* | 4/2022 | O'Mahony | G06F 3/0653 |
| 2022/0147279 A1* | 5/2022 | Goss | G06F 3/0604 |
| 2022/0245269 A1* | 8/2022 | Jones | G06F 21/6218 |

* cited by examiner

| SOURCE | DESTINATION | SECURITY | COMPRESSION | POLICY |
|---|---|---|---|---|
| USER 3 | PBA X-Y | KEY A | LOSSLESS | 1, 4, 5, 9 |
| USER 1 | PBA X-Y | KEY A | LOSSY | 1, 9 |
| USER 6 | PBA X-Y | KEY A, B | LOSSLESS | 4, 5, 9 |
| USER 2 | PBA X-Y | KEY B, C | LOSSLESS | 9 |
| USER 3 | PBA X-Y | KEY A | LOSSLESS | 1 |
| USER 4 | PBA X-Y | KEY C | LOSSLESS | 1, 5, 9 |
| USER 5 | PBA X-Y | KEY B | LOSSY | 1, 2, 3 |
| USER 1 | PBA X-Y | KEY A | LOSSLESS | 6, 8, 9 |
| USER N | PBA X-Y | KEY D | LOSSLESS | 1, 5, 6, 8, 9 |

DATA STORAGE SYSTEM WITH DECENTRALIZED POLICY ALTERATION

SUMMARY

The present disclosure is generally directed to decentralizing data storage system analysis and policy alterations.

A data storage system, in various embodiments, tracks data access operations to a memory with a distribution module and translate the tracked data access operations into at least one activity with the distribution module. The distribution module generates a decentralization strategy and then creates a first visual representation of the at least one activity and a second visual representation of the at least one activity with the distribution module. The respective visual representations are distributed to a first user and a second user with the first user and second user respectively selected by the decentralization strategy for analysis for a purpose assigned by the decentralization strategy. The distribution module grants the first user a first temporary permission to alter at least one operational policy of the memory in response to a result of the first purpose.

In other embodiments of a data storage system, a tracking strategy is generated with a distribution module to track data access operations to a memory. The distribution module generates a display strategy and translates the tracked data access operations into at least one activity. A first visual representation of the at least one activity and a second visual representation of the at least one activity is created in accordance with the display strategy. An analysis strategy is generated with the distribution module and the first visual representation is distributed to a first user while the second visual representation is distributed to a second user with the first user and second user respectively selected by the analysis strategy. The first visual representation is analyzed by the first user for a first purpose assigned by the analysis strategy and the distribution module assigns a first task to the first user to alter at least one operational policy of the memory in response to the first visual representation and a result of the first purpose.

Other embodiments of a data storage system track data access operations to a memory with a distribution module before translating the tracked data access operations into at least one activity with the distribution module. A first visual representation of the at least one activity is created and a second visual representation of the at least one activity is created with the distribution module. The distribution module generates a decentralization strategy and distributes the respective first and second visual representations to first and second users with the first user and second user respectively selected by the distribution module in accordance with the decentralization strategy. The distribution module alters a responsibility of the first user to change at least one operational policy of the memory in accordance with the decentralization strategy in response to the first visual representation.

DETAILED DESCRIPTION

Assorted embodiments of a data storage system intelligently distribute system activity analysis and policy alteration to users and/or hosts to provide optimal, decentralized system performance, security, and resource allocation.

The proliferation of data generation, transmission, and storage has emphasized the performance and security of data storage components over time. As data storage devices and memories are utilized, maintenance and adaptations to operational policies can maintain optimal performance and security characteristics. However, the tracking of system activities and analysis of the activities to determine what operational policy adaptations are needed can be difficult, time consuming, and resource intensive. The centralization of activity tracking and operational policy adaptation generation in system components can provide limited security, but at the cost of increasingly volatile system performance. Hence, various embodiments conduct intelligent decentralization of system activity analysis and operational policy alterations to allow centralized computing components to conduct optimized data storage operations.

Figure 1:
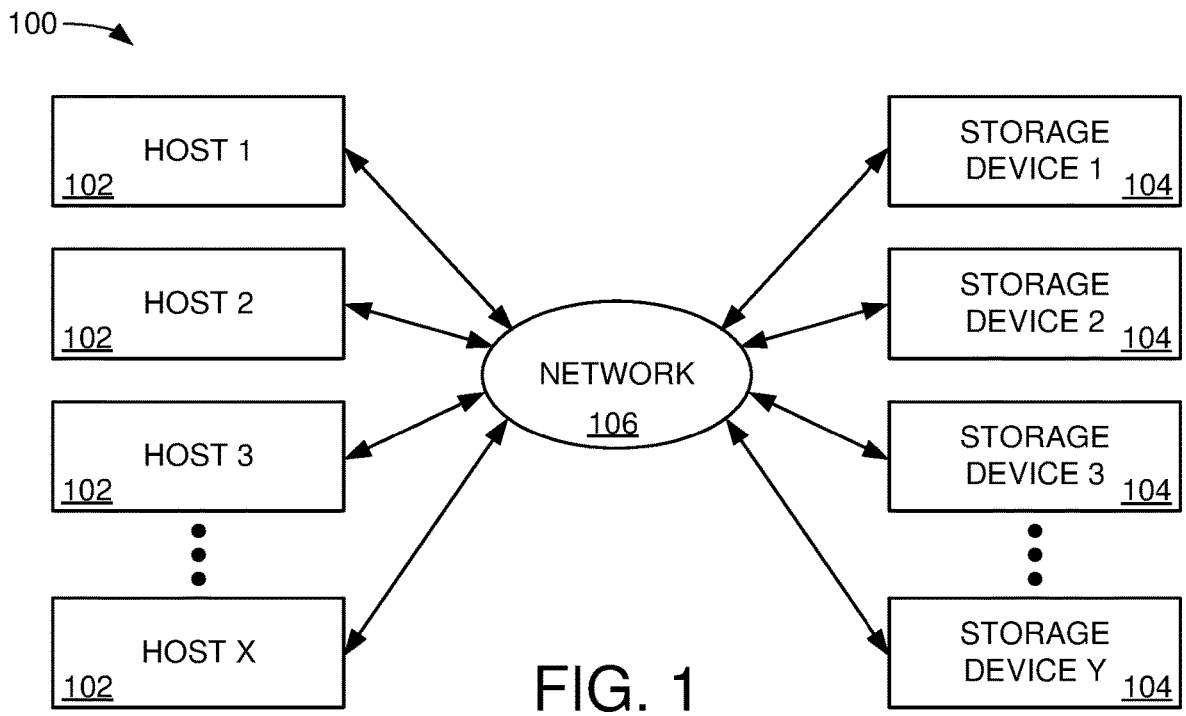
FIG. 1 provides a functional block representation of a data storage system in which various embodiments can be practiced.

An example data storage system 100 in which assorted embodiments are practiced is depicted as a block representation in FIG. 1. The data storage system 100 connects any number (X) of hosts 102 to any number (Y) data storage devices 104 via one or more wired and/or wireless networks 106. The various hosts 102 can be positioned in any location with any type, performance, and capability to create, transfer, and receive data stored in one or more data storage devices 104. The assorted data storage devices 104 are not limited to a uniform configuration and can have any capacity, performance capability, and type of memory to store data. It is contemplated that the respective data storage devices 104 employ non-volatile memory, such as solid-state memory cells and/or rotating magnetic media.

With the assorted hosts 102 respectively creating data and/or data access requests to the data storage devices 104, separate ownership, security, compression, encryption, and mapping may be used. Such separate, and potentially different, data and data access configurations emphasize accurate tracking of data, data accesses, and the memory in which data is stored. However, greater numbers of hosts 102, and more sophisticated separate data configurations, correspond with inefficient system 100 activity tracking. In addition, system activity tracking has traditionally been available only to system administrators and in formats that do not intelligently convey the status, performance, and/or vulnerabilities of data, hosts 102, or data storage devices 104.

Figure 2:
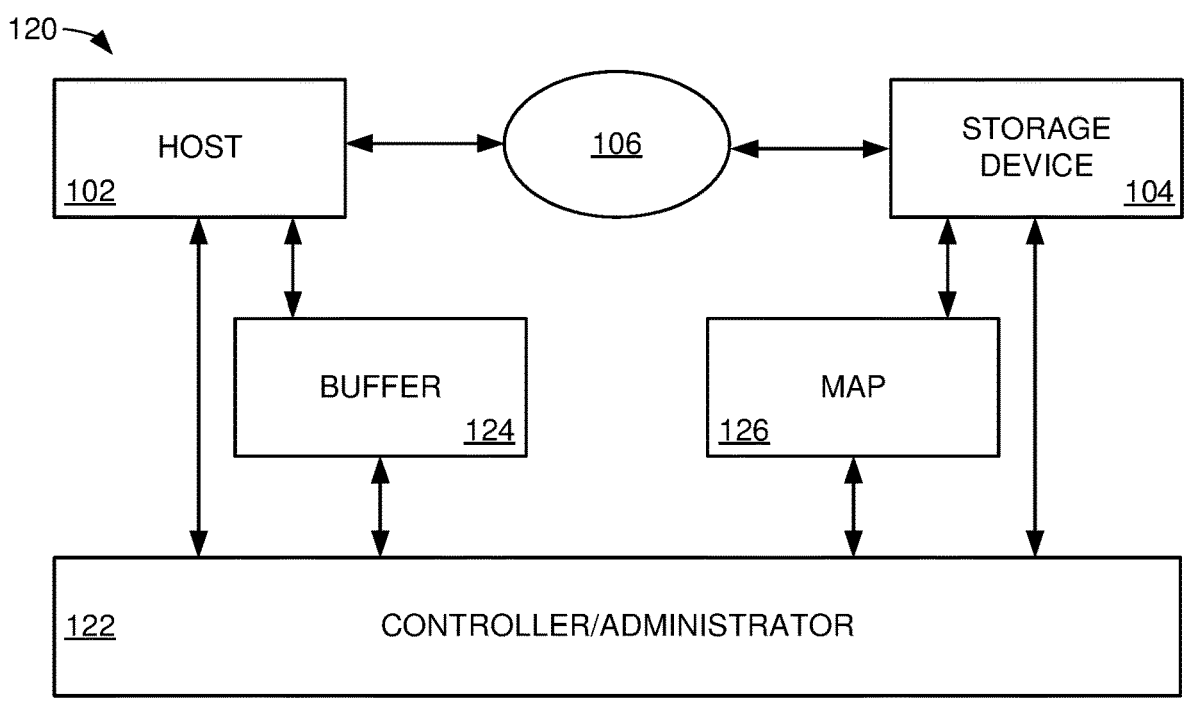
FIG. 2 shows aspects of an example data storage device arranged in accordance with some embodiments.

FIG. 2 depicts a block representation of portions of an example data storage system 120 arranged to provide data and system activity tracking in accordance with some embodiments. A single host 102 is shown connected to a single data storage device 104 that employs at least one non-volatile memory, but such arrangement is not limiting or required as additional hosts 102, data storage devices 104, and network interconnections 106 can be employed concurrently and sequentially. Each system 120 host 102 and data storage device 104 is connected to at least one activity controller 122 that services as an administrator of policies dictating how data is stored, retrieved, and maintained.

The activity controller 122 can selectively utilize one or more buffers 124 to temporarily store data flowing back and forth between hosts 102 and data storage devices 104. It is contemplated that the activity controller 122 can select between more than one buffer 124 data repository, such as different volatile and/or non-volatile memories with different data access latencies, error rates, physical sizes, and/or storage capacities. As data flows to the data storage device 104, a map module 126 is activated by the activity controller 122 to describe at least the logical and physical locations of data in memory of the device 104.

In response to data generated by the host 102 being stored in the data storage device 104 and/or data stored in the data storage device 104 being accessed by the host 102, the activity controller 122 logs various status, performance, and vulnerability metrics. For instance, the controller 122 can monitor, track, and log, the initial request for data storage, or retrieval, the overall time to carry out the request, the error rate of data accesses to the data storage device 104, the location of data in the memory of the data storage device 104, the compression of stored data, the number of accesses to the physical memory cells of the data storage device 104, the number of accesses to the data currently stored in the data storage device 104, the background operations conducted on the data, and the owners of the assorted requests for the data in the data storage device 104. While monitoring and logging these, and other, system activities and metrics can be useful for the activity controller 122 to organize data, pending data access requests, and logical units, such as garbage collection units, namespaces, and/or containers, the addition of multiple hosts 102 and/or data storage devices 104 quickly jeopardizes overall system performance by tracking and logging various system activities and metrics, particularly when different hosts 102 have sophisticated and/or different ownership, performance guarantees, and/or data configurations.

Figures 3, 4:
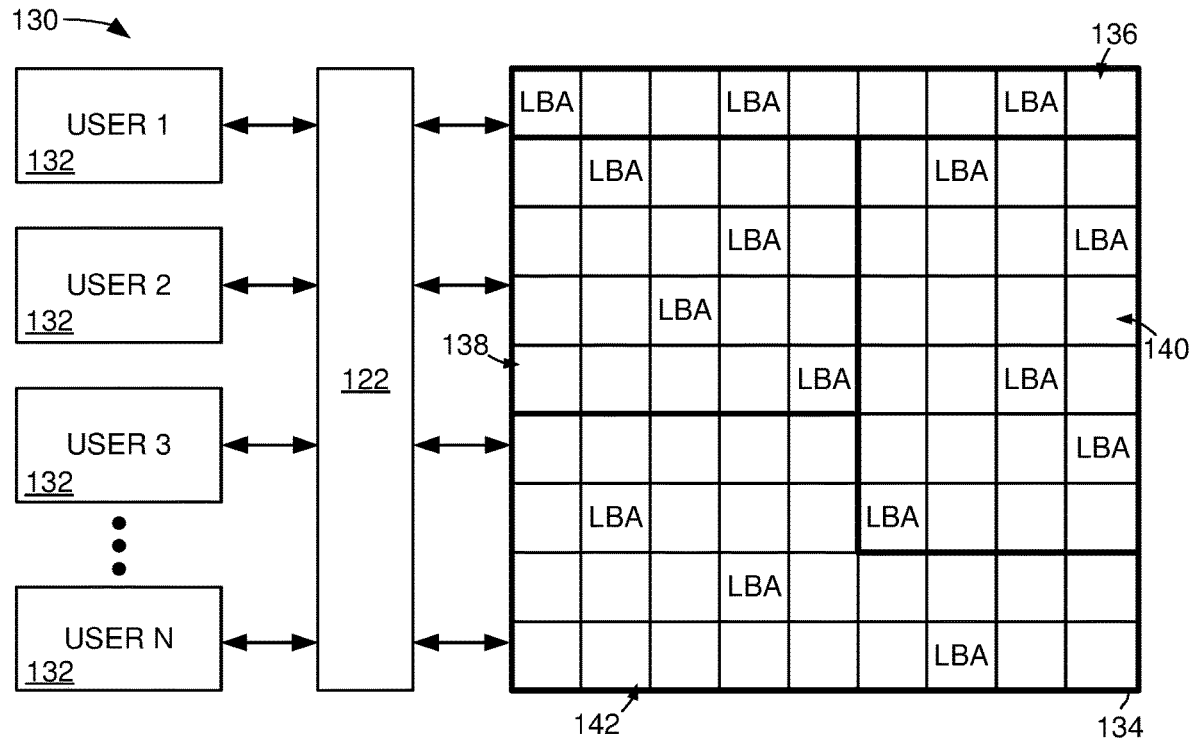
FIG. 3 shows a block representation of portions of an example data storage system configured in accordance with some embodiments.
FIG. 4 illustrates an example activity view compiled from a data storage system in assorted embodiments.

FIG. 3 conveys portions of an example data storage system 130 in which an activity controller 122 carries out various embodiments of system activity and metric tracking. The activity controller 122 can direct operations from any number of users 132, which can be human or other non-computing entity acting as a host for access to a data repository 134. The data repository 134 is visually shown in FIG. 3 as a continuous grid of logical block addresses (LBA), but can be any number of different memories resident in different data storage devices. For example, the constituent repository LBAs can correspond with physical block addresses (PBA) located in separate data storage devices and memories located in different locations, such as different cities, countries, and/or continents.

It is noted that various portions of the data repository 134 can be logically divided into one or more units, such as namespaces, garbage collection units (GCU), calibration groups, containers, and partitions. One or more data storage controllers can allocate the various logical and physical aspects of the data repository 134 over time to provide sufficient data reliability, security, and availability. A storage controller can execute one or more operational policies that dictate how, where, and when data is stored and retrieved. For instance, operational policies can dictate what can access data once stored (ownership), what can update stored data, how data is compressed, what encryption is applied to data (security), and what logical and/or physical addresses are available for data.

In the non-limiting example of FIG. 3, a first user has data stored in a namespace 136 that the first user has exclusive ownership while data from a second user is stored redundantly in multiple different namespaces 138 & 140. Portions of data from a third user can be temporarily, or permanently, stored in addresses 142 dedicated to shared storage for any connected user. With the various operational policies in place and, potentially, providing different parameters for how data is handled, where data is stored, and when data can be accessed, the activity controller 122 can detect, log, and track the execution of the assorted operational policies. That is, the activity controller 122 can log at least how data is stored/retrieved, when data is stored/retrieved, where data is stored/retrieved, and who requested access to data. It is noted that the activity controller 122 may additionally monitor and track operations to memory cells that are not initiated by user/host requests, such as cell calibrations, garbage collections, mapping, error correction, and allocation of memory for overprovisioning.

Although tracking data accesses and memory cell operations can be conducted by the activity controller 122, the presence of numerous different users 132 having different volumes of activity associated with different data ownerships, security, and permissions can degrade data access performance of the data storage system 130. As a result of heightened volume and/or complexity of system acidity, the activity controller 122 may be slowed or suspended to preserve data access performance, which jeopardizes the accuracy of tracked operations and the ability of the controller 122 to provide current status, statistics, and performance that can be used to optimize speed, reliability, and/or security of data accesses.

The complexities and operational volatility associated with tracking activity from multiple different users 132 can be exacerbated by static activity tracking policies that dictate how and what the activity controller 122 monitors and logs for tracking. Accordingly, various embodiments are directed to intelligently altering tracking controller 122 operational policies to provide accurate and efficient status of system activity without degrading average or peak data access performance for the system 130.

Through dynamic activity tracking operational policies, tracked parameters, status, statistics, and performance can be intelligently formatted, analyzed, and displayed to authorized users, administrators, and hosts to allow a distribution of tracked information and a reduction in time and processing resources needed to translate the tracked information into data access operational parameter changes that can optimize the performance of the system 130. By correlating current, pending, and predicted workloads to various logical units, such as namespaces, containers, and GCUs, the activity controller 122 can intelligently operate with policies selected to provide accurate tracking without degrading the actual and/or potential data access performance to the data repository 134.

FIG. 4 depicts a block representation of portions of control dashboard 150 that is compiled, analyzed, and conveyed by an activity controller monitoring at least one memory connected to one or more users/hosts. It is noted that the various information conveyed in the dashboard 150 is not limiting or required as the dashboard 150 can be configured by an activity controller 122 to show any detected and predicted operational parameter, statistic, and performance for any aspect of a data storage system. The example view of FIG. 4 displays how various information can be compiled into a chronological list with the source of the activity, destination of any data movement, operational policies conducted, and operational statistics involved, as well as the status, workload, and performance of the involved memory cells and/or logical unit.

It is noted that the compilation of the various metrics and tracked operational parameters can be resource and time intensive for the activity controller, particularly when different users concurrently conduct data accesses to different memories with different operational policies and permissions. It is further noted that the compilation of tracked metrics and/or performance, such as the view shown in FIG. 4, can be more resource and time intensive than if raw tracked data is logged and depicted. Hence, embodiments of the activity controller can control the expenditure of system resources by altering what information is tracked, how tracked information is compiled, and how tracked information is shown along with who receives the compiled information and what level of granularity conveyed. The ability to adjust the operational policies of the activity controller allows for optimized activity tracking, compiling, analyzing, and delivery to one or more recipients, such as an administrator, user, or other host.

The activity controller 122 employs circuitry of a distribution module 160 to analyze current and predicted system workloads and performance to develop a tracking strategy that preemptively prescribes alterations to activity controller operational policies to provide optimal use of system resources to track data and system activity and provide heightened system performance, reliability, and/or security.

Figure 5:
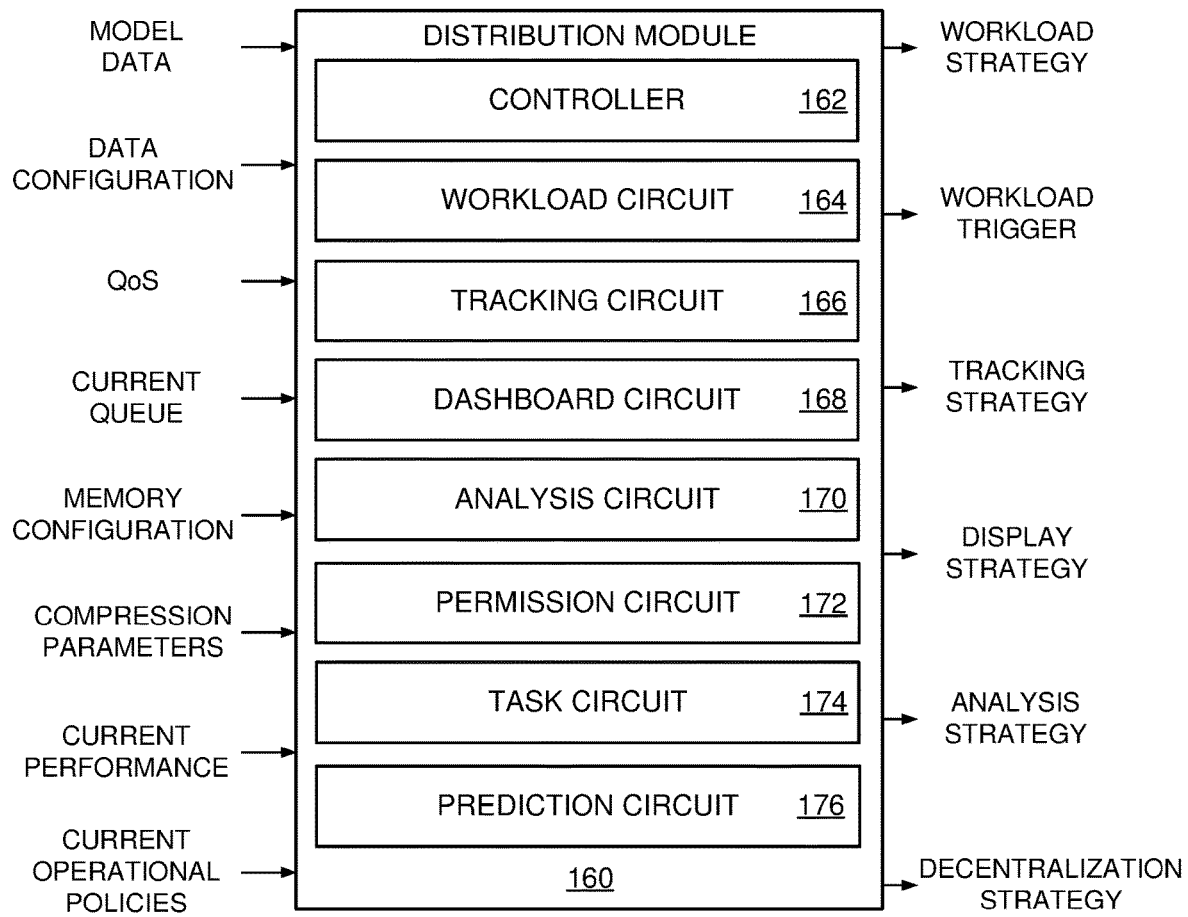
FIG. 5 depicts a block representation of an example distribution module that can be employed in various embodiments of a data storage system.

FIG. 5 depicts an example distribution module 160 that can be employed in a data storage system in accordance with assorted embodiments to schedule and carry out intelligent system activity tracking and analyzing to generate operational policy changes that can maintain optimal system resource allocation and performance. The module 160 can utilize one or more controllers 162 to translate a variety of input information into at least a workload detection strategy, a workload trigger, tracking strategy, display strategy, and decentralization strategy that can be selectively, and concurrently, conducted to provide data access management optimization and system evaluation decentralization in view of dynamic data access workloads to various memories from numerous different users/hosts.

The module controller 162 may be a standalone circuit, such as a microprocessor or other programmable circuitry, resident anywhere in a data system, such as in a standalone node, network node, host, or data storage device. Regardless of where a controller 162, and module 160, is located in a data system, the data access activity to one or more memories can be monitored and logged along with the current memory configuration, security protocol, quality of service criteria, and data locations. The module controller 162 can input past logged information, such as error rate, data access latency, location of stale data, and garbage collection activity. While current and past information about the data system in which the module 160 is resident can be procured, the controller 162 may additionally refer to one or more data models pertaining to other data storage systems, memories, or host access activity.

While not limiting, the distribution module 160 can input assorted current and past logged conditions for one or more memories of a data storage system. For instance, the current physical block addresses of various calibration groups, the addresses of past data access errors and failures, the current physical and logical configurations of memory cells, and the pending data operations to the memory cells can be utilized individually, and collectively, to understand current namespace configurations and performance as well as future cell arrangements for namespace optimization.

The module controller 162 can operate alone to generate and maintain the various strategies to control current and future namespace workloads, configurations, and data access operations. However, some embodiments employ assorted circuitry to aid the module controller 162 in efficiently creating, altering, and executing the respective output strategies. A workload circuit 164 can assist the module controller 162 in translating the various input information into a workload strategy that has one or more triggers that correspond with a namespace operational policy change in order to mitigate, or eliminate namespace data access performance degradation. It is noted that while a namespace logical unit is discussed in association with workloads, such granularity is not limiting and workloads and various module strategies can be generated for different granularities, such as by data storage device, memory die, GCU, or source of data.

Although not required or limiting, the workload circuit 164 can generate and maintain multiple workload strategies for separate namespaces and/or memory die which allows for concurrent optimization of the respective memory cells through the execution of different operational policy changes prescribed by the respective operational strategies in response to detected, or predicted, activity that meets a predetermined workload trigger. For instance, a first namespace may have a first workload strategy generated by the workload circuit 164 that prompts the execution of a first set of data tracking, compilation, analysis, and/or data access operational policy changes, in response to a first trigger being met while a second namespace of a data storage device has a different workload strategy and triggers that prompt a different set of operational policy changes customized to the second namespace based on the workload to that namespace.

In order to induce customized and optimized system activity tracking, compilation, and delivery, the distribution module 160 can generate, maintain, and selectively execute a tracking strategy, display strategy, and operational strategy based on past, current, pending, and model data pertaining to system performance. A tracking circuit 166 can contribute to the various strategies by determining what system activity is tracked, how the activity is tracked, and what granularity is used to track the activity. The tracking circuit 166 may be considered an analysis engine, along with other circuitry of the module 160, as assorted aspects of the structural, operational, and policy of a data storage system can be evaluated to determine what is going to be tracked, and how. Some embodiments employ the analysis of the distribution module 160 in conjunction with analysis assigned to one or more hosts/users with respect to the tracked information compiled into a dashboard.

The ability to adapt what is tracked allows the tracking circuit 166 to customize what system resources are utilized and ensure expended resources are optimal for workloads to maintain, or increase, data access performance. For instance, the tracking circuit 166 can adapt tracking data accesses to a physical die of memory cells to tracking host-initiated data read and write requests to a namespace. In such example, the tracking circuit 166 prescribes to the tracking strategy that a first workload corresponds with logging each operation of each memory cell in a die, such as data refreshes, data reads, data writes, data mapping, data moves, garbage collection, and error corrections, while a second workload corresponds with logging each data read and each data write to a namespace.

The adjustment of both what is being tracked and the granularity of the tracking allows a tracking strategy to quickly pivot system resources so that dynamic workloads do not degrade overall system performance. The tracking circuit 166 may further determine what parameters, metrics, and statistics are tracked. As a non-limiting example, the tracking circuit 166 may prescribe that the source of a memory cell access be tracked, the permissions used to access data, how data was processed with compression and/or encryption, and various statistics, such as error rate, latency, time to completion, and physical block address of data accesses.

Through the adjustment of what activity is tracked and what metrics are tracked during an activity, the tracking circuit 166 can maintain the tracking strategy as customized and optimized to current and predicted system conditions. The prescription of granularity changes in the tracking strategy, such as logging activity to each memory cell, plane of memory cells, die of memory cells, data storage device, or logical group of memory cells, further creates a sophisticated and optimized strategy that accumulates sufficient volumes of information for the distribution module 160 to ascertain the status of the data storage system as well as potential vulnerabilities/opportunities to increase system performance and consistency.

With the tracking circuit 166 determining what information is tracked with what granularity and from what portions of a data storage system via the tracking strategy, a display strategy can similarly prescribe what tracked information is compiled into a dashboard, how information is displayed in the dashboard, and who is intended to see the dashboard. A dashboard circuit 168 can cooperate with the module controller 162 to generate and maintain the display strategy, which can evolve over time as the connected hosts/users change and/or the data and activity of the system changes. The predetermination of a display strategy by the distribution module 160 allows tracked information to be compiled into the visual form prescribed by the display strategy more efficiently than if tracked information was buffered until the module 160 assigned a dashboard type and the content to be shown in the dashboard.

The dashboard circuit 168 can provide additional guidance for the display strategy, such as what lens is used to convey tracked information to a host/user, how often tracked information is updated, the granularity of displayed information, if the tracked information is shown as an interactive dashboard, and if raw and/or translated information is displayed. An interactive dashboard allows a host/user to select and/or change the information being shown, such as between different granularities, activities, and/or activity sources. Raw tracked information may be unformatted while translated information is formatted for host/user consumption, which can involve simplified addresses, descriptions, resulting performance, and identification tags assigned by the distribution module 160 during tracking.

An analysis circuit 170 can translate the information gathered as directed by the tracking strategy and tracking circuit 166 into decisions that can be made by the distribution module 160 as well as recipients of a dashboard for assorted purposes. For instance, the analysis circuit 170 can prescribe various dashboard analysis purposes to one or more users/hosts, such as security, performance, or capacity purposes. The user/host analysis purpose assigned by the analysis strategy can have different granularities as well, such as analysis of information and decisions pertaining to current system status, potential vulnerabilities, and operational policy changes for each namespace, container, data storage device, memory die, or memory cell.

In some embodiments, the analysis circuit 170 determines who sees tracked information. The analysis circuit 170 can contribute to the display strategy by prescribing what information is shown to which host/user, which may be less than the entire volume of tracking information. The display strategy may further involve different views and tracked information delivery to different hosts/users that are customized to the permissions assigned to the receiving host/user, such as error mitigation, data mapping, background operation execution, and namespace memory cell allocation.

By inputting current operational policies that dictate how data is handled and stored as well as how memory cells are used and maintained, the distribution module 160 can determine what activity analysis and policy alterations are needed to provide optimal data access performance, reliability, and security. That is, the distribution module controller 162 can preemptively determine what system resources will be employed to conduct accurate activity analysis and generate operational policy alterations that will provide optimal system operation in view of current and future device/memory/namespace workloads. The understanding of what system resources are needed to translate tracked system activities into operational policy adaptations to provide optimal data access operation correlates into a decentralization strategy that prescribes which remote users/hosts are allowed to conduct system activity analysis and/or generate operational policy changes.

The decentralization strategy, generally, conveys who analyzes the activity and information tracked in accordance with the tracking strategy, who generates policy changes in response to the activity analysis, and who executes policy changes. The proactive generation of a variety of different analysis and policy alteration generation settings allows the distribution module 160 to efficiently adapt to dynamic workload and system resource availability to provide consistent data access performance throughout the analysis and policy alteration generation process. The preemptive generation and maintenance of the decentralization strategy further allows for efficient adjustment of dashboards and tracked activities to conduct activity analysis and policy adaptations without degrading system availability or data access performance.

While not required or limiting, the decentralization strategy can consist of one or more permissions given to recipient users/hosts to conduct operational policy alterations. A permission circuit 172 can evaluate the capabilities of various remote users/hosts and compare those capabilities with the resources estimated to be consumed based on workload, activity analysis via one or more dashboards, and generation of policy adaptations to supply the decentralization strategy with multiple different temporary user/host permissions to enact operational policy changes. In other words, the permission circuit 172 creates temporary alterations to what system changes a user/host can normally conduct to allow policy adaptations to be efficiently carried out.

The permission circuit 172 can provide the decentralization strategy with a variety of different temporary user/host permissions. For instance, the permission circuit 172 can prescribe a user/host to verify the analysis and/or operational policy alteration generated by another decentral user/host. Such verification can reduce the performance and security risk of distributing policy alterations to non-central system components. The permission circuit 172, alternatively or additionally, can provide different permission to assorted users/hosts to allow step-wise separate analysis and/or policy alteration generation, which can further decentralize the policy alteration process.

The permission circuit 172, in some embodiments, can assign permissions for user/hosts to provide security monitoring of other user/host activity analysis and/or policy alteration generation. As an example, a first user/host can be given a temporary permission to see what another connected user/host is analyzing and/or generating while a second user/host can be given a temporary permission to compare policy alterations to existing security protocol for a given device, memory, and/or namespace to ensure policy alterations do not violate protocol or unduly put portions of a data storage system at risk for a third-party attack.

The ability to grant permissions to various users/hosts for a temporary timeframe before returning to a default permission set that does not allow for operational policy changes and/or system activity analysis allows the distribution module 160 to maintain data integrity and reliability despite granting power to decentralized aspects of the system. A granted permission can enable a remote user/host to conduct various activities, but does not necessarily mandate the recipient of system activity to produce anything. That is, granting a permission allows a user/host to conduct actions, such as analysis, viewing, and policy alterations, but does not require such actions to be carried out, which can provide flexibility for the user/host to conduct the actions at a convenient time. However, open permissions can add complexity to a data storage system that can produce incomplete activity analysis and/or policy alterations.

Accordingly, the distribution module 160 can build the decentralization strategy with one or more direct tasks to be assigned to a user/host. The task circuit 174 can complement the permission circuit 172 by combining the granting of a temporary permission with a task to be completed that utilizes the permission. For instance, a permission to generate and/or conduct system operational policy alterations can be combined with an assigned task of improving data access performance, capacity, capabilities, and/or security within a prescribed timeframe. While not exhaustive or limiting, the decentralization strategy can be populated with a variety of tasks to be assigned to users/hosts, such as altering operational policies to increase security of data and/or data storage components, to increase data storage performance by decreasing latency and/or error rates, or to increase the availability of memory cells by altering one or more background memory operations.

It is contemplated that the task circuit 174 assigns to a user/host one or more metrics to improve or maintain through at least one operational policy alteration. Non-limiting examples of such assigned metrics involve decreasing namespace data access latency, memory cell error rate, overall time to complete a data access request, and vulnerability to third-party attacks. The task circuit 174 can populate the decentralization strategy with purposes, such as identifying successful third-party attacks, unsuccessful third-party attacks, the validating component during security protocol, and firmware version used during security initialization. Other decentralization strategy aspects provided by the task circuit 174 can involve identifying the location of stale data, location of overprovisioned memory cells, data access frequency of memory cells, and cells available for immediate data storage.

It is noted that the task circuit 174 can assign, or alter, the granularity of various user/host purposes and/or metrics. That is, the decentralization strategy can assign and/or vary the granularity in which a user/host returns activity analysis results and/or alters operational policies. For example, the decentralization strategy can prescribe a first granularity of namespace-level or container-level for operational policy alterations before changing to a second granularity of memory die or memory cell-level granularity for identifying metrics and/or conducting assigned analysis purposes. The ability to prescribe different tasks and analysis purposes complements the permissions provided to a user/host to intelligently utilize the available resources of the user/host to reduce the burden of activity tracking, analysis, and policy adaptations on centralized system components, such as a network controller, data storage device controller, and signal channels.

The execution of one or more strategies generated by the distribution module 160 provides a balance of data access request satisfaction speed with the scope, depth, and granularity of system activity tracking in a manner that meets a predetermined Quality of Service (QoS) standard, deterministic input/output window, or performance threshold. The ability to intelligently track the satisfaction of data access requests along with memory cell operations provides valuable information that allows the distribution module 160 to prescribe and/or execute memory cell operational policy changes that optimize current and/or future system performance, such as data access speed, reliability, and security. The correlation of intelligent system activity tracking with detected, and predicted, workloads to various portions of memory ensures system resources are utilized in an optimal manner.

The generation of assorted aspects of the workload and other strategies can provide sophisticated reactions to encountered namespace workloads as well as proactive actions that mitigate performance degradation due to activity tracking when conditions and/or activity change. The proactive generation of the workload and other strategies by the distribution module 160 allows the module controller 162 to execute workload, namespace, data access request, and memory cell operation control actions quickly and efficiently once a workload trigger is reached. In contrast, purely reactive generation of namespace and/or memory cell operation manipulation actions by the distribution module 160 would involve additional processing and time to evaluate and generate the proper action(s) to establish workload control and provide continued namespace data access performance to satisfy one or more predetermined expectations.

While the saving of processing overhead, the configuration of the respective workload, activity tracking, display, and decentralization strategies with both reactive and proactive actions provide intelligent long-term namespace and memory cell optimization that cannot be achieved with static operational policies or purely reactive generation of action(s) to control and optimize the operation of memory cells in view of workload. The generation of proactive actions and identifying future workload and namespace operational performance for the respective strategies is aided by a prediction circuit 176. A prediction circuit 176 can input assorted current and past operations, actions, and activity, along with model data from other memory, to forecast at least one future namespace operational condition, data access request, or data access performance.

The accurate prediction of memory, data access request, metadata, and namespace conditions along with data access performance allows the respective strategies generated by the distribution module 160 to have one or more operational policy adaptations to mitigate, or completely avoid, a forecasted future operational occurrence that can degrade system performance, reliability, or security. The prediction circuit 176 can further forecast how long different strategy actions will take for varying system conditions, which allows the module 160 to quickly adjust between different policy changes to provide a practical workload control and maintain operational performance without unduly stalling or degrading overall data storage system performance.

With the tracking strategy prescribing what system metrics, statistics, and activities to monitor while the display strategy prescribes how tracked information is shown to predetermined users/hosts and the decentralization strategy dictates what actions and purposes users/hosts are assigned, the distribution module 160 can adapt how system resources are used with respect to the actual, pending, and/or predicted workload to portions of a data repository, such as a namespace, physical memory die, range of PBAs, or range of LBAs. The gathering and display of assorted system information allows the distribution module 160 to analyze the information with the analysis circuit 170 and prescribe tracked activity analysis purposes to one or more decentralized users/hosts, which eases the burden of activity analysis on the module 160 and other centralized system processing components.

Figure 6:
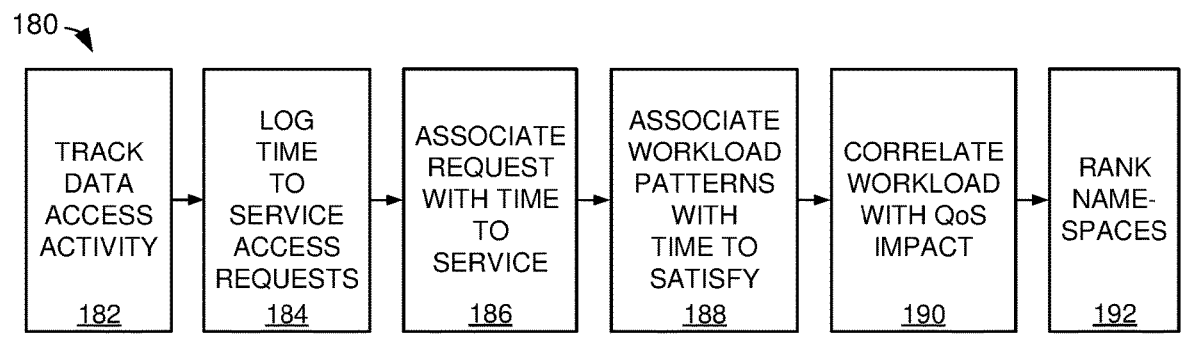
FIG. 6 is a timeline of an example workload procedure that may be conducted in a system in accordance with assorted embodiments.

FIG. 6 depicts an example workload detection procedure 180 that can be carried out in a data storage system via an distribution module in accordance with various embodiments. Data accesses are tracked in step 182 by the distribution module. As such, the distribution module can track assorted data access metrics concurrently or sequentially. The overall time to service a data access request is logged by the distribution module in step 184. It is noted that the overall time to satisfy a data access request is not the only activity tracked in 182, but such activity tracking can be prioritized by redundantly monitoring and interpreting the elapsed time from submission of a data access request by a host to the return of data, in the case of a read request, or the writing of data to a namespace, in the case of a write request.

The logged time to service a data access request can be evaluated in isolation or with the service times of other data access requests to a namespace to determine how long a new data access request to a namespace would take to service. As a result of the logging of actually completed data access requests in step 184 along with the association of new data access requests with an estimated time to service, the distribution module can compile the workload for a namespace. That is, the combination of previously satisfied data access requests and estimated time to service new requests provides enough information for a distribution module to determine the workload for a namespace. Hence, the distribution module generates and maintains a workload value for each namespace that corresponds to how long a data access request takes to be satisfied. A namespace workload further corresponds to the memory cell operational performance of a namespace as well as the current channel and processor capabilities that service memory cells of a namespace.

With the logging of actual request satisfaction times in step 184 and the association of future requests with request satisfaction times in step 186, the distribution module can compile workload values over time for each namespace of a device/system. The tracking of workloads to various namespaces allows the distribution module to identify various workload patterns that reliably indicate future data access request satisfaction times, processing requirements, and buffer memory requirements in step 188. The combination of the determination of namespace workload and the association of workload patterns with future namespace time to satisfy a data access request provides ample information for the distribution module to correlate current namespace workload with an impact to predetermined namespace operational performance and/or power consumption expectations in step 190, such as QoS, deterministic window, error rate, and average data access latency.

Through the tracking of workloads and correlation of those workloads with impact to predetermined namespace operational performance, the distribution module can rank the various available namespaces in step 192 with the aid of the ranking circuit. Such namespace ranking can organize namespaces by availability, efficiency, reliability, read performance, or write performance. For instance, the distribution module can rank namespaces in step 192 by which namespaces can service a request most quickly (availability), with least processing consumption (efficiency), with least error rate (reliability), read request latency, average request service time, or write request latency. The ranking of namespaces allows the distribution module to generate and adjust operational strategy policy actions that provide the greatest opportunity to satisfy performance expectations in view of current and future predicted namespace workloads.

Figure 7:
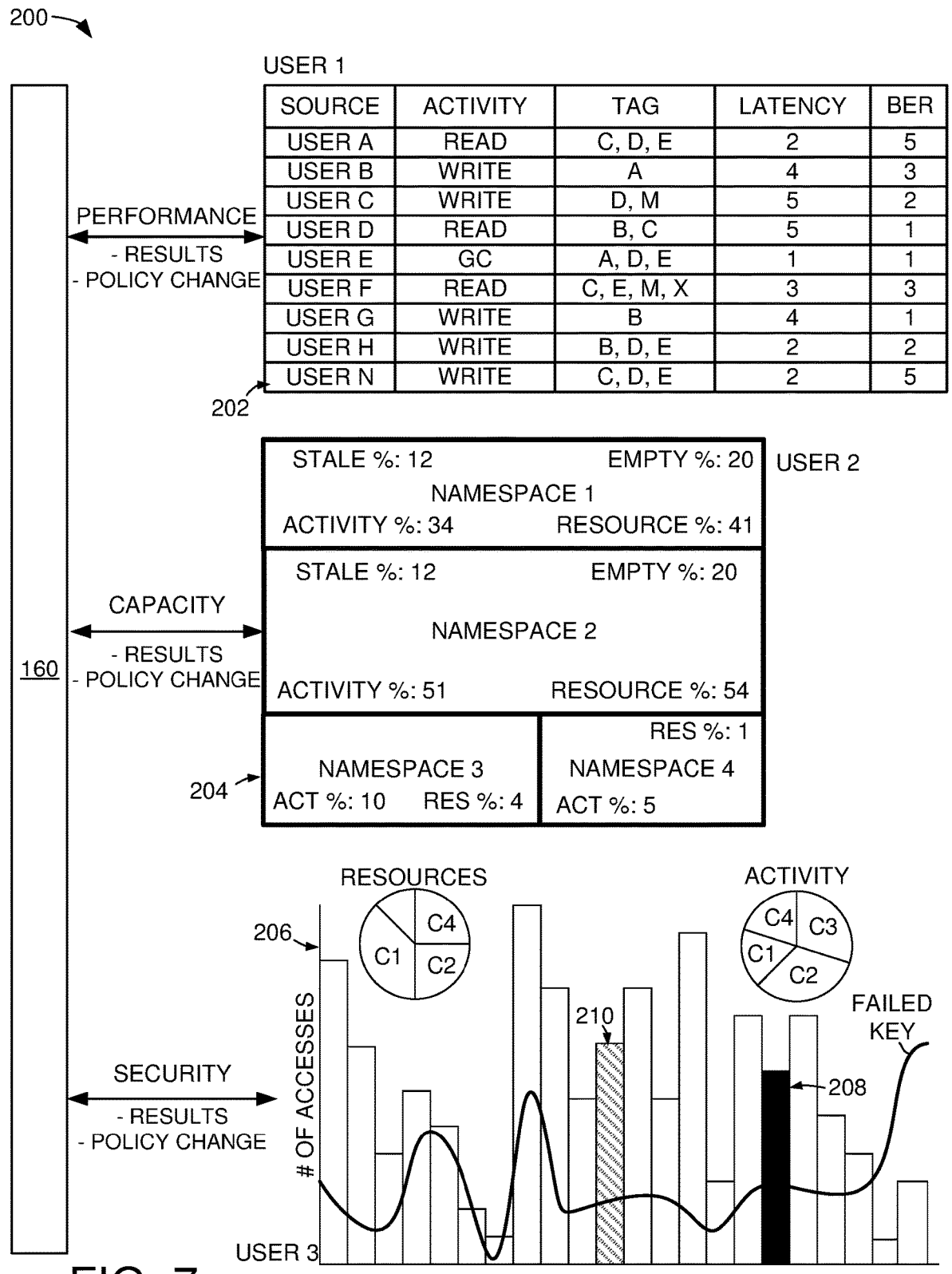
FIG. 7 depicts a block representation of portions of an example data storage system utilized in accordance with some embodiments.

FIG. 7 depicts a block representation of portions of an example data storage system 200 in which assorted embodiments can be practiced. As part of a tracking strategy executed in combination with the display strategy, system workloads, system activity, and available resources can be detected to prompt the compilation and display of the first dashboard 202 to at least a first predetermined user/host (USER 1). The first dashboard 202 conveys an example grid view that displays raw and/or translated system information to various portions of memory concurrently. The distribution module 160 can alter what information is shown in the first dashboard 202 as well as whom has access to the information. Hence, the distribution module 160 can broadcast the first dashboard 202 to multiple different users, but with different information displayed in accordance with the user's security clearance and/or available resources to interpret the displayed information.

The distribution of the first dashboard 202, as prescribed by decentralized strategy, can correspond with different permissions and capabilities for the recipient host/user to interpret the dashboard information and execute portions of the operational strategy. For instance, different users can be given different permissions to analyze information from the first dashboard 202 and execute one or more policy changes dictated by the preexisting operational strategy, such as suspending background operations, altering the allocation of memory cells for a namespace, or prioritizing data access to a particular namespace to meet a guaranteed performance metric.

In the non-limiting example shown in FIG. 7, the first user/host is assigned a performance purpose for analyzing the information of the first dashboard 202. Such performance purpose can correspond with an unlimited variety of metrics, parameters, and calculated statistics, but may involve the user/host returning at least some performance information relating to the analyzation of the dashboard 202 to the distribution module 160, such as the latency, error rate, or data access frequency of a memory cell, memory die, container, or namespace.

The analyzed performance results can be processed separately by the distribution module 160 and/or correspond with one or more operational policy changes generated and carried out by the first user/host. It is noted that the assigned analysis purpose can correspond with the permissions that the first user/host is granted and the operational policy changes the first user/host is allowed to conduct alone. While not limiting, it is contemplated that the first user/host can alter operational policy for performance optimization by moving pending data access requests in a queue, alter where pending data is buffered, prioritize data access requests to certain portions of memory, alter memory cell's reference calibration, and change background operations timing and/or procedure. By changing one or more operational policies, the first user/host takes advantage of the granted permissions and previously conducted activity analysis to induce intelligent system operation adaptations for an assigned purpose.

Although the example first dashboard 202 and performance analysis purpose did not assign a particular task, a decentralization strategy may, at any time, assign a task corresponding with a performance purpose, such as decrease latency to a selected namespace or maintain a QoS or deterministic data access window for a period of time. It is noted that the execution of a tracking strategy may accumulate raw information about an unlimited variety of system parameters, such as current and predicted error rates (BER), data access latency, overall time to complete a user-generated request, data access frequency, reference voltage calibration, and memory access request type (READ/WRITE).

The raw information can be translated by the distribution module 160 into statistics, activities, and metrics that describe the status of portions of the data storage system, such as data write, data read, data mapping, data consolidation, garbage collection, background operation, security vulnerability, namespace access frequency, stale data locations, and failed security attack locations. The accumulation of raw information with, or without, translated system information allows the distribution module 160 to intelligently select future information gathering granularity and compile a variety of different types of dashboards with information, data, metrics, parameters, and statistics customized for the recipient user, in accordance with the predetermined display strategy, to optimize the user's ability to visually analyze and interpret the information of the dashboard.

While the distribution module 160 can send a similarly configured dashboard 202 to multiple different users/hosts for the same, or different, analysis purposes, various embodiments send differently configured dashboards to different users/hosts for the same, or different, analysis purposes. The non-limiting example of FIG. 7 conveys how the distribution module 160 compiles a map type dashboard 204 for a second user/host (USER 2) in accordance with display and decentralization strategies. It is noted that the distribution module 160 can alter the existing grid type dashboard 202 displayed to the first user/host. The map type dashboard 204 illustrates the physical and/or logical location of memory and data along with the associated activity and resource levels.

Although not required or limiting, the second dashboard 204 has a namespace granularity set by the distribution module 160 where the percentage of overall system activity, the percentage of system resources consumed, the percentage of memory cells containing stale data, and the percentage of memory cells containing no user-generated data are simultaneously shown for each namespace. If the distribution module 160 was to change the granularity of the second dashboard 204, such as to memory cell level, memory die level, or logical container level, the activity (ACT), resource (RES), stale data, and empty cell information would be displayed for each memory cell, memory die, or logical container, respectively.

In some embodiments, the map type dashboard 204 conveys data access frequency for logical data addresses and/or physical data addresses. Such data access frequency can be depicted as colors, shading, symbols, or outlines to convey where data accesses are occurring over time. The illustration of data access frequency can be characterized as a memory cell heat map as more frequently accessed memory cells are considered hotter than less frequently accessed memory cells. Regardless of the analysis purpose associated with the map type dashboard 204, the illustration of a heat map can efficiently visually convey to a user/host how often memory cells are being accessed by host-generated data access requests as well as system-generated background operations, such as cell refreshes, cell reference calibrations, garbage collections, data mapping, and data movement.

The example second dashboard 204 conveys information to allow a recipient user/host to conduct memory capacity analysis purposes, such as determining where stale data is located for garbage collections, where duplicate data can be consolidated, distributing data to physical addresses to reduce hot memory cells, and if overprovisioned memory cells can be repurposed to replace or supplement other memory cells of a namespace, die, or container. By having a user/host analyze how the data capacity of a namespace, memory die, container, or data storage device can be optimized by altering one or more existing operational policies and/or stored data, other data storage system components can quickly carry out the changes prescribed by the user/host with minimal, if any, degradation in overall system performance, reliability, or security.

As shown by the third dashboard 206, tracked information can be compiled by the distribution module 160 into a graphical representation, in accordance with the display and analysis strategies, corresponding to a namespace granularity with the number of data accesses over time as well as the number of failed security and/or encryption key attempts over time. It is noted that other granularities can be conveyed by the third dashboard 206 as well as other raw and/or translated information in similar, or dissimilar, graphs. For instance, different graphs can each correspond with particular ranges of physical or logical data addresses while conveying different types of information, such as raw bit error rate, translated activity type, translated attempted third-party attacks, and raw number of connected hosts/users.

As shown, the second dashboard 204 is conveyed to the second user with a data capacity purpose assigned by the distribution module 160. Such capacity purpose can return to the distribution module 160 a variety of information, such as location of stale data, immediately available data addresses, location of overprovisioned memory cells, and the system resources consumed by various memory cells, memory die, containers, and/or namespaces. The second user/host may be assigned a data capacity themed task in accordance with a decentralization strategy, such as increase available capacity, consolidate stored data, or group available memory cells in a logical configuration. The combination of data capacity themed analysis results and one or more permissions granted by the distribution module 160, which may accompany one or more tasks, allows the second user/host to execute one or more generated operational policy changes, such as moving existing data, changing the destination for pending data, altering the configuration of namespaces and/or containers, commissioning overprovisioned memory cells, and activating unscheduled background memory cell operations.

The ability to customize what tracked information is shown by a dashboard 202/204/206 in accordance with the display strategy complements the analysis and operational policy changes of the decentralization strategy. The graph type dashboard 206 shown in FIG. 7 can be delivered to a third user/host (USER 3) with information formatted to be conducive to a security analysis purpose, such as finding past successful and unsuccessful third-party attacks 208, locating vulnerable physical and/or logical data addresses 210, and identifying when a security key needs to be changed or upgraded. While the graph type dashboard 206 can be used to convey other tracked information conducive to other analysis purposes, such as data access performance or data capacity, the overlay of multiple different graph styles, such as the line, pie, and bar graphs of dashboard 206, allows a user/host to visually identify where security activity has occurred and what reactions can optimize security operation, such as use a different key, move sensitive data, or allocate namespaces to different logical data addresses.

With the assignment of a security themed activity analysis purpose, the third user/host can return one or more security themed analysis results, such as the presence of past successful and unsuccessful attacks, vulnerable data locations, and logs of security protocols, data verifications, and system component initializations. The analysis results can be used to satisfy one or more tasks and/or generate operational policy changes. Possible tasks, while not limiting, can consist of increasing reliability of portions of memory, preventing future types of attacks, securing a particular system device or memory, or increasing memory initialization. It is contemplated that operational policy changes created by the third user/host can involve deactivating portion of memory, preventing access to portions of memory, changing security credentials, like keys, passwords, and certificates, throttling access to portions of memory, and heightened volumes of monitoring of memory for particular types of third-party attacks.

Through the execution of predetermined display and decentralization strategies that compile information accumulated via a tracking strategy, the distribution module 160 can intelligently select assorted users/hosts to receive dashboards compiled with raw and/or translated system information customized to the user/host as well as the analysis purpose assigned to the respective decentralized users/hosts. It is contemplated that the distribution module 160 can customize the information tracked, compilation of dashboards, and distribution of dashboards to users/hosts with assigned analysis purposes based on detected and/or predicted system workloads. That is, the distribution module 160 can alter tracking, display, and decentralization strategies based on system workloads so that system resources are optimally expended without degrading data access performance to any one data storage device, namespace, container, or memory die, which increases the system's capability to guarantee and satisfy performance over time, such as for QoS and deterministic windows.

Figure 8:
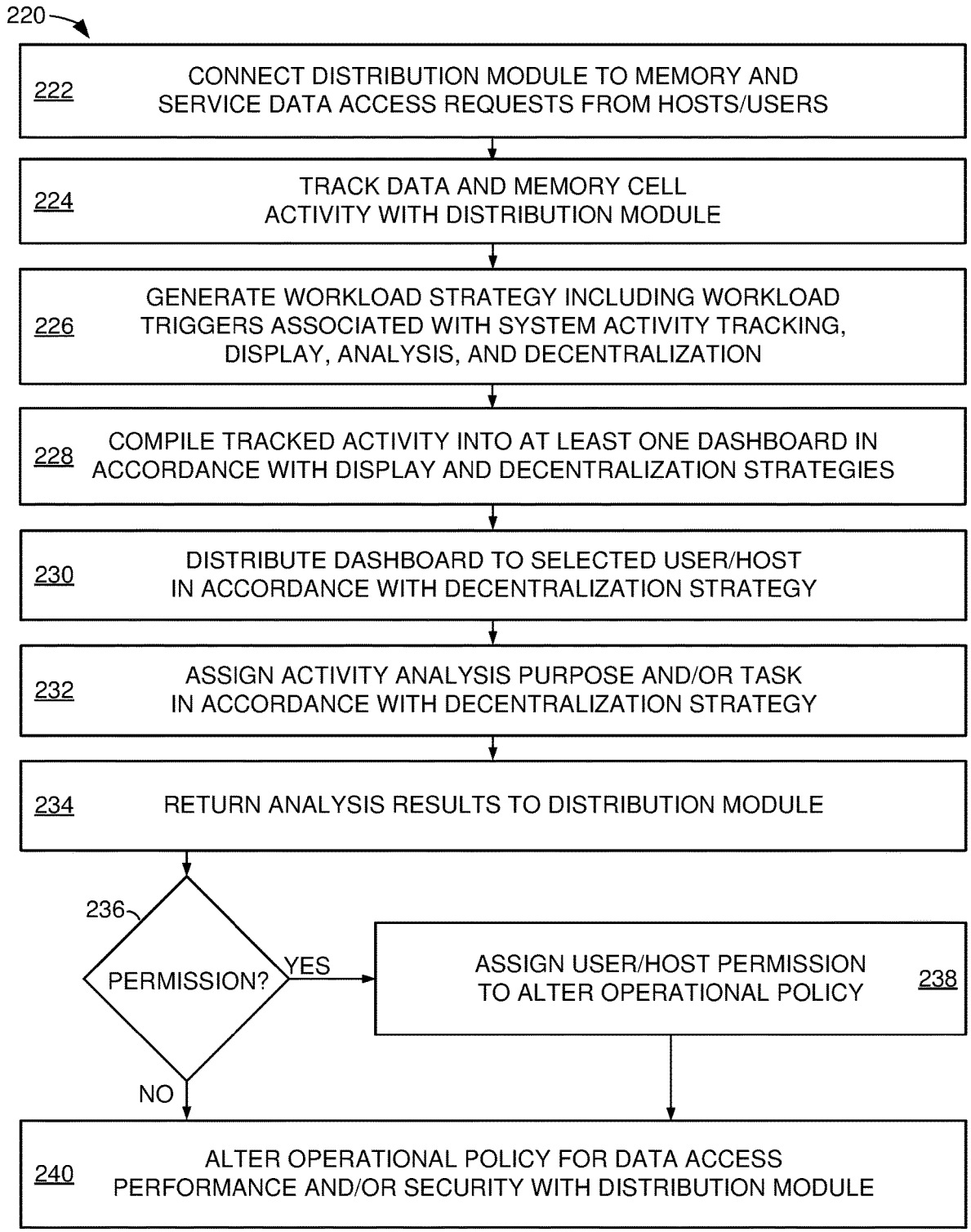
FIG. 8 is a flowchart of an example policy decentralization routine that can be carried out with the embodiments of FIGS. 1-7.

FIG. 8 conveys an example activity decentralization routine 220 that can be carried out with the assorted embodiments of FIGS. 1-7 to control what data storage system activity is tracked, who sees the tracked information, how the tracked information is displayed, why decentralized analysis is conducted, and what actions a user/host can conduct in response to activity analysis. Connection of a distribution module to a memory, such as a solid-state data storage device, allows for the initialization of the memory to service data access requests from hosts/users external to the memory, such as a third-party human user, in step 222. It is contemplated that the distribution module may oversee, or dictate, the establishment of various logical units, such as overprovisioned groups, garbage collection units, and zoned namespaces, that can occupy any physical and logical data block addresses in one or more data storage devices, die of memory cells, and planes of memory cells.

Activity to the assorted memory cells is subsequently tracked by the distribution module in step 224 to determine the capabilities, current performance, and operational configuration of the memory cells as well as the assorted logical units. It is noted that the distribution module can track any number of different data access and memory behavior metrics over time. The tracked data access activity and memory characteristics compiled by the distribution module from step 224 allows the distribution module to assign workload values to various groups, such as the respective namespaces, that correspond with at least the volume of data accesses conducted for a given length of time. An assigned workload value may be more sophisticated, as directed by the distribution module, and can include a compilation of memory cell efficiency and/or reliability with availability. The ability to adapt the tracking of activity for a memory cell and/or logical unit and the generation of a workload value for allows the distribution module to conduct more, or less, rigorous processing and time to determine how much system capability is occupied by data access operations initiated by external hosts/users as well as background memory operations, such as garbage collection, memory refresh, and data mapping.

The detected workloads are monitored over time by the distribution module while a workload strategy is generated in step 226. The workload strategy establishes when various portions of memory can benefit from reactive and/or proactive operational policy changes that provide data access performance manipulation and sets a workload trigger to prompt execution of activity tracking, display, or analysis change in step 226. It is contemplated that the workload strategy, and established triggers, can correspond with activity tracking, system performance analysis, and/or system metric compilation that intelligently conveys what is occurring in the data storage system to one or more hosts/users. The generation of strategies by the distribution module in step 226 may further involve generating a tracking strategy that dictates what system information to log and compile as well as a display strategy that dictates who sees what information in what manner, an analysis strategy establishing for what purpose a user/host is analyzing information, and a decentralization strategy prescribing what policies and permissions a user/host can change as a result of tracked activity analysis.

The correlation of the various system activity and operational strategies with current, pending, and predicted workloads provides intelligent use of system resources to monitor, log, compile, and analyze the flow of data, use of memory cells, and data handling operations. In accordance with the tracking and display strategies, tracked system activity is compiled into a dashboard in step 228 in accordance with the predetermined display and analysis strategies. As discussed above, the display strategy, in combination with the collection of activities, statistics, and metrics as prescribed by the tracking strategy, can convey multiple different dashboards, different information, and different information granularities to different hosts/users assigned by the decentralization strategy. For instance, the distribution module in step 228 can log system activity corresponding to particular activities, data source, data destination, security handling, compression handling, or tag assigned by the distribution module prior to displaying such information as part of a dashboard that can provide raw, untranslated information or information translated into a visually optimized format, such as a graph or map.

Step 230 proceeds to distribute the dashboards compiled in step 228 to selected, decentralized user/hosts with one or more analysis purposes assigned by the decentralization strategy. As a result of step 230, various decentralized users/hosts of the data storage system can conduct at least visual inspection of one or more dashboards to render at least one analysis result that can be returned to the distribution module in step 234 and generate one or more operational policy changes. An analysis result can be any information rendered from a dashboard conveying tracked activity while an operational policy alteration can be any modification to an existing policy for handling data, memory cells, and/or security protocol, such as changes to security settings, data access performance settings, data organization and configuration settings, or logical memory allocations into namespaces and/or containers.

It is noted that the distribution of dashboards to remote users/hosts, analysis of dashboards for assigned purposes, and generation of operational policy changes can be triggered by predetermined volumes of detected or predicted workload to a particular portion of a data storage system, such as a memory cell, namespace, data storage device, or container. Regardless of whether activity analysis and policy alterations are tied to workloads, decision 236 evaluates if a user/host is to be given one or more permissions to conduct alterations to existing operational policy, such as adding to an existing policy, changing a policy, or removing a policy. If so, step 238 assigns a user/host at least one permission to alter operational policy for a predetermined amount of time set in the decentralization strategy.

With a user/host having permission to execute one or more generated policy changes, the user/host can carry out the changes at efficient times determined by the user/host and/or the distribution module. It is contemplated that multiple different users/hosts can be given a diverse variety of permissions that correspond with the alteration of operational policies concurrently from different sources. In the event the decentralization strategy calls for no user/host permission to execute generated operational policy changes, step 240 returns the generated changes to the distribution module for execution. It is contemplated that the return of policy changes to the distribution module can result in the module controller carrying the changes out or the assignment of another user/host that did not generate the policy change to execute the policy change, which provides flexibility for the distribution module to carry out policy changes without degrading current data access performance for a data storage system.

The assorted embodiments of a distribution module allow for the intelligent tracking of data, generation of customized dashboards for user/host analysis, assignment of analysis purposes, and generation of operational policy changes in view of tracked activity analysis to provide optimal current and future data access performance, reliability, and security. One or more graphical user interfaces are created and maintained to enable a user/host to visually assess the status of a system, such as locations in which data sets are stored on and among various data storage devices. Embodiments can provide multiple alternative views, such as grid, map, and graph views that generally show representations of the data storage system. It is contemplated that a display strategy conveys information in a list view in a dashboard, which generally lists tabulated data. As a result, a user can optimally browse both large and small data sets.

By allowing the user/host to switch between the different dashboard configurations, such as between grid and list views with a single mouse click or other activation, the user/host can quickly determine whether a particular data set is large or small and provide an optimal mechanism for obtaining desired details regarding each. While not required, the list view is compact and shows each record as a single row, which is useful to quickly scan and compare large sets of data while a grid view presents more detail and often a visual representation of the record and is suited for browsing small data sets, as well as larger sets where the higher fidelity data representation is necessary.

While not limiting, in at least some cases, a data storage system has an analysis engine as part of the storage device or system controller functionality. This might be a software/firmware routine operated in the background that monitors ongoing system activity and makes available data structures with the types of data that may be requested. The system would further include API style code that would generate a display interface on a display device of each authorized user. Search terms could be entered by the user/host for a particular search and the results displayed or transferred in any suitable format. The system might be considered analogous to a search engine style device, but it would be system specific. Maps or other graphical information might be incorporated into the interface to provide an authorized user with a graphical representation of the system status and performance. It is contemplated that the main system would be a keyboard/text interface, but this is not required as other interface options could be used including audio-to-text mechanisms.

With the intelligent utilization of a distribution module in accordance with assorted embodiments, a balance can be established and maintained between system resources expended on logging, displaying, and analyzing activity compared to operational policy changes that can optimize system performance and resource allocation. That is, less system resources can be expended on activity tracking, display, and/or analysis to provide short-term data access performance capabilities in some instances while more system resources can be expended on tracking and/or displaying system activity to provide the distribution module an accurate understanding of the status of at least one memory, which leads to operational policy changes that can ensure optimized data access performance, reliability, and security. The correlation of workloads to activity tracking, compilation, display, and operational policy alteration further provides a balance of system resource expenditure with real-time data access performance.

What is claimed is:
1. A method comprising:
tracking data access operations to a memory with a distribution module;
translating the tracked data access operations into at least one activity with the distribution module;
creating a first visual representation of the at least one activity and a second visual representation of the at least one activity with the distribution module;
distributing the first visual representation to a first user and the second visual representation to a second user, the first user and second user respectively selected by the distribution module;

assigning a first analysis purpose to the first user and a second analysis purpose to the second user with the distribution module;
analyzing the first visual representation by the first user for the first purpose;
granting the first user a first temporary permission with the distribution module to alter at least one operational policy of the memory in response to a result of the first purpose.

2. The method of claim 1, wherein the distribution module grants a second temporary permission to the second user to alter at least one operational policy of the memory.

3. The method of claim 2, wherein the second temporary permission is different than the first temporary permission.

4. The method of claim 2, wherein the distribution module grants the second temporary permission in response to the first user altering at least one operational policy of the memory.

5. The method of claim 1, wherein the first and second visual representations are different.

6. The method of claim 1, wherein the first and second visual representations are generated to convey information associated with the respective first and second temporary permissions.

7. The method of claim 1, wherein the first user alters a data access performance operational policy in response to the first visual representation.

8. The method of claim 1, wherein the first user alters a security operational policy in response to the first visual representation.

9. The method of claim 1, wherein the first user alters a memory cell background operational policy in response to the first visual representation.

10. A method comprising:
generating a tracking strategy with a distribution module;
tracking data access operations to a memory in accordance with the tracking strategy;
generating a display strategy with the distribution module;
translating the tracked data access operations into at least one activity with the distribution module;
creating a first visual representation of the at least one activity and a second visual representation of the at least one activity in accordance with the display strategy;
generating an analysis strategy with the distribution module;
distributing the first visual representation to a first user and the second visual representation to a second user, the first user and second user respectively selected by the analysis strategy;
analyzing the first visual representation by the first user for a first purpose assigned by the analysis strategy; and
assigning a first task to the first user with the distribution module to alter at least one operational policy of the memory in response to the first visual representation and a result of the first purpose.

11. The method of claim 10, wherein the distribution module assigns a second task to the second user to alter at least one operational policy of the memory in response to the second visual representation.

12. The method of claim 11, wherein the first and second tasks are different.

13. The method of claim 11, wherein the distribution module adds a third task to the first user to alter at least one operational policy of the memory.

14. The method of claim 10, wherein the distribution module alters the first visual representation in response to the first user altering at least one operational policy of the memory.

15. The method of claim 11, wherein the distribution module analyzes the at least one activity and assigns a third task to itself to alter at least one operational policy of the memory.

16. The method of claim 15, wherein the first task, second task, and third task are undertaken simultaneously by the respective first user, second user, and distribution module.

17. A method comprising:
tracking data access operations to a memory with a distribution module;
translating the tracked data access operations into at least one activity with the distribution module;
creating a first visual representation of the at least one activity and a second visual representation of the at least one activity with the distribution module;
generating a decentralization strategy with the distribution module;
distributing the first visual representation to a first user and the second visual representation to a second user, the first user and second user respectively selected by the distribution module in accordance with the decentralization strategy; and
altering a responsibility of the first user to change at least one operational policy of the memory in accordance with the decentralization strategy in response to the first visual representation.

18. The method of claim 17, wherein the decentralization strategy alters a responsibility for the first user to change at least one operational policy of the memory.

19. The method of claim 17, wherein the first user changes the at least one operational policy without involvement by the distribution module.

20. The method of claim 17, wherein the distribution module assigns the second user to verify the at least one operational policy change made by the first user before the at least one operational policy is changed.

* * * * *